(12) United States Patent
Okuno

(10) Patent No.: US 9,470,963 B2
(45) Date of Patent: Oct. 18, 2016

(54) LIGHTING DEVICE AND PROJECTION TYPE VIDEO DISPLAY APPARATUS

(71) Applicant: Panasonic Intellectual Property Management Co., Ltd., Osaka-shi, Osaka (JP)

(72) Inventor: Manabu Okuno, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 49 days.

(21) Appl. No.: 14/592,545

(22) Filed: Jan. 8, 2015

(65) Prior Publication Data

US 2015/0192848 A1 Jul. 9, 2015

(30) Foreign Application Priority Data

Jan. 9, 2014 (JP) .................................. 2014-002111
Dec. 26, 2014 (JP) .................................. 2014-266307

(51) Int. Cl.
*H04N 9/31* (2006.01)
*G03B 21/20* (2006.01)
*F21V 7/00* (2006.01)
(Continued)

(52) U.S. Cl.
CPC ............. *G03B 21/2066* (2013.01); *F21V 7/00* (2013.01); *F21V 13/04* (2013.01); *G02B 27/1033* (2013.01); *G03B 21/2013* (2013.01); *H04N 9/3114* (2013.01); *H04N 9/3158* (2013.01);
(Continued)

(58) Field of Classification Search
CPC .......... G03B 21/2013; G03B 21/2066; G03B 21/204; G03B 21/2033; H04N 9/3164; F21L 14/023; G02B 27/106; G02B 6/0066; G02B 6/0068; G02B 6/0073; F21V 5/00; F21V 5/002; F21V 5/005; F21V 5/02; F21V 7/0091; F21V 7/0041
USPC ................ 362/234, 247, 227; 359/629, 618; 353/94, 98, 99
See application file for complete search history.

(56) References Cited

U.S. PATENT DOCUMENTS 5,743,612 A 4/1998 Matsuda et al.
2002/0033933 A1* 3/2002 Yamamoto ......... G02B 27/1046
353/94
(Continued)

FOREIGN PATENT DOCUMENTS

JP H09-133974 5/1997
JP 2007-249138 9/2007
(Continued)

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

A lighting device includes plural light sources, an optical coupling device including plural reflection members each having a reflection surface, the optical coupling device reflecting plural light beams emitted in plural directions from the plural light sources at the reflection surfaces of plural reflection members and coupling the plural light beams to generate a coupled light beam in an identical direction, and a homogenization device that homogenizes the coupled light beam from the optical coupling device. In at least one of the plural reflection members, a cutout portion is formed to transmit an incident light beam on the reflection surface of the other reflection member such that the incident light beam is not blocked by a part of a region of the at least one reflection member on the way to the reflection surface of the other reflection member.

8 Claims, 13 Drawing Sheets

(51) Int. Cl.
*F21V 13/04* (2006.01)
*G02B 27/10* (2006.01)
*G02B 26/00* (2006.01)

(52) U.S. Cl.
CPC ........... *H04N 9/3164* (2013.01); *G02B 26/008* (2013.01); *G02B 27/106* (2013.01)

(56) References Cited

U.S. PATENT DOCUMENTS

| | | | |
|---|---|---|---|
| 2003/0227598 A1* | 12/2003 | Shouji | G02B 27/1046 353/31 |
| 2005/0146891 A1* | 7/2005 | Hatakeyama | G02B 13/0095 362/551 |
| 2005/0254018 A1* | 11/2005 | Magarill | H04N 9/3164 353/94 |
| 2007/0115667 A1* | 5/2007 | Lin | G03B 21/2013 362/301 |
| 2009/0273760 A1 | 11/2009 | Itoh | |

FOREIGN PATENT DOCUMENTS

| | | |
|---|---|---|
| JP | 2009-294639 | 12/2009 |
| WO | WO 2010/116725 | 10/2010 |

\* cited by examiner

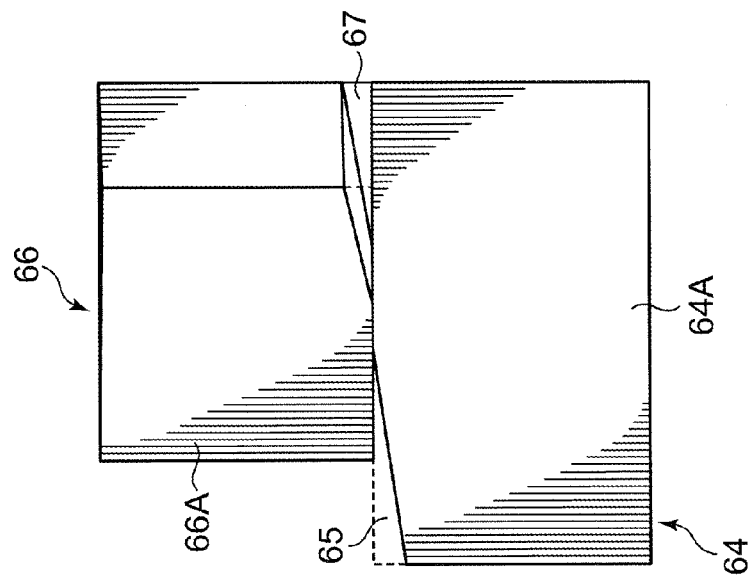
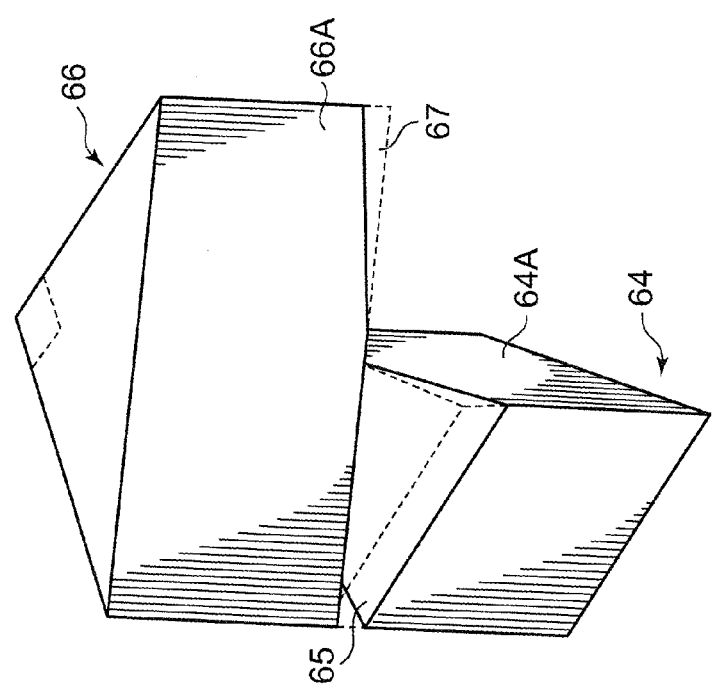

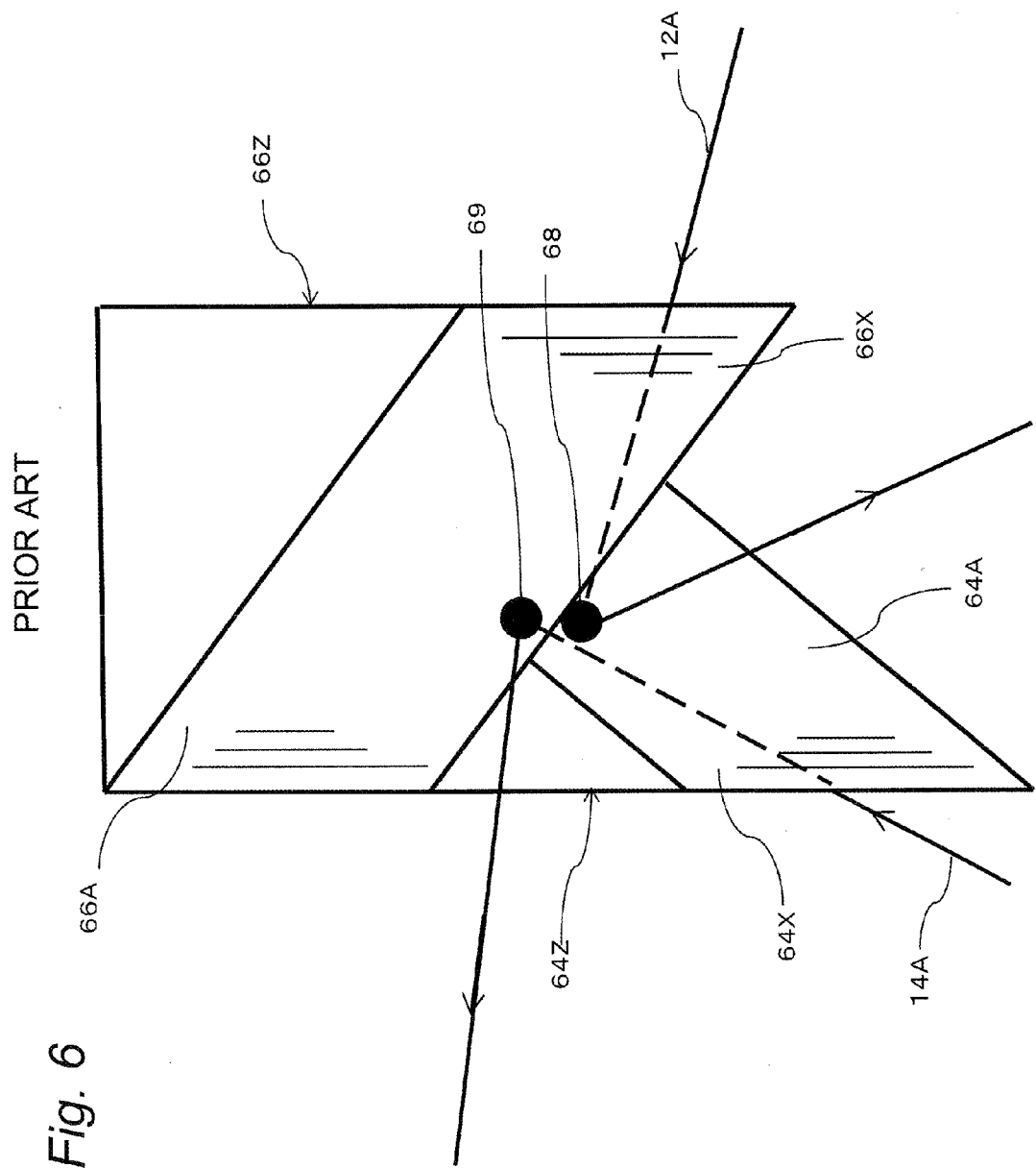

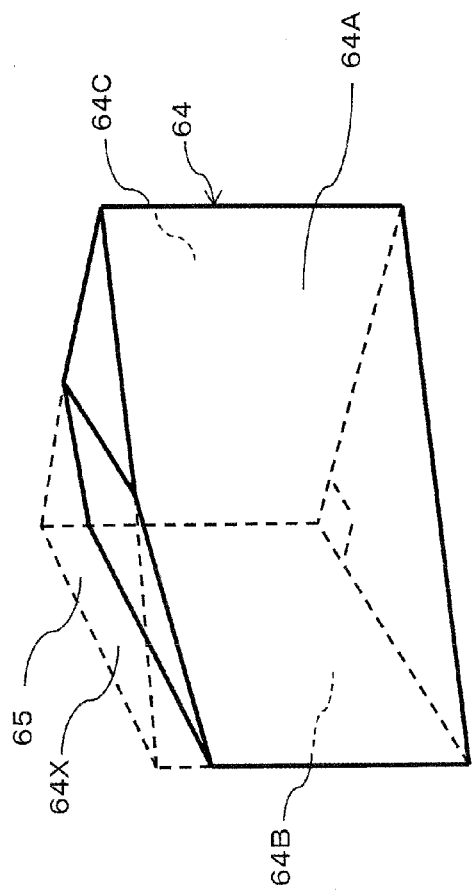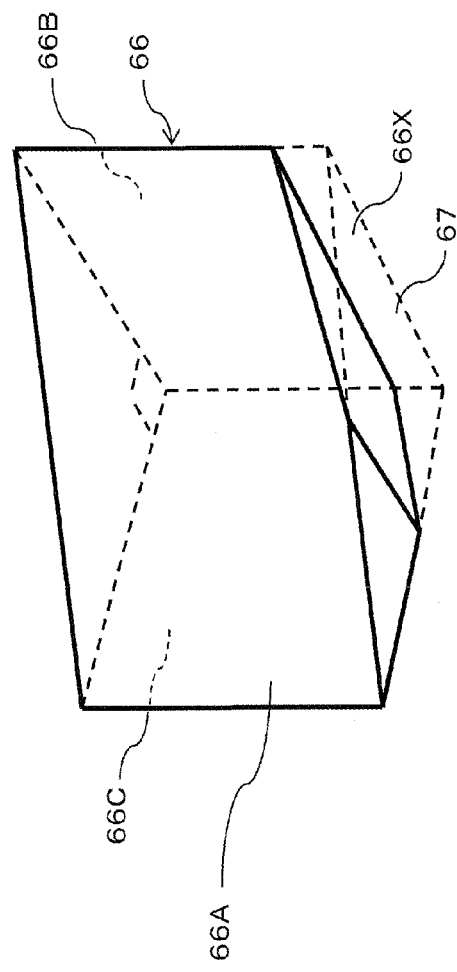
Fig. 7A
Fig. 7B

LIGHTING DEVICE AND PROJECTION TYPE VIDEO DISPLAY APPARATUS

BACKGROUND

1. Technical Field

The present disclosure relates to a lighting device that couples and outputs light beams from a plurality of light sources, and a projection type video display apparatus provided therewith.

2. Related Art

Conventionally, for a projector, there is proposed a lighting device that couples light beams from a pair of light source lamps by reflecting the light beams toward one direction with a reflector plate having a V-shape in section, and guides a coupled light beam to a video generator (for example, see Japanese Patent Publication Laid-Open No. JP 09-133974 A).

The lighting device reflects the outgoing light beams from the pair of light source lamps provided opposed to each other on a plane couple by the reflector plates having the V-shape in section and couples the reflected light beams. Therefore, the coupled light beam is formed with optical axes of the pair of light source lamps horizontally separated from each other with a predetermined gap.

In such a lighting device, in the case that the coupled light beam from the pair of light source lamps is guided to the video generator through a rod integrator having an incident surface with vertically-long rectangular shape in section, vignetting occurs in the coupled light beam by the rod integrator to decrease a quantity of light beam incident on the rod integrator.

For this reason, the high-brightness projector is hardly formed using such a type of lighting device.

The present disclosure provides a lighting device that couples and outputs the light beams from the plurality of light sources and can output the high brightness light.

SUMMARY

In a first aspect, a lighting device is provided, which includes: a plurality of light sources; an optical coupling device comprising a plurality of reflection members each having a reflection surface, the optical coupling device reflecting a plurality of light beams emitted in a plurality of directions from the plurality of light sources at the reflection surfaces of the plurality of reflection members and coupling the plurality of light beams to generate a coupled light beam in an identical direction; and a homogenization device that homogenizes the coupled light beam from the optical coupling device. In at least one of the plurality of reflection members, a cutout portion is formed to transmit an incident light beam on the reflection surface of the other reflection member such that the incident light beam is not blocked by a part of a region of the at least one reflection member on the way to the reflection surface of the other reflection member.

In a second aspect, a projection type video display apparatus is provided, which includes the lighting device according to claim 1, an optical modulation element that modulates a light beam from the lighting device to generate a video light beam representing a video image, and a projection lens that projects the video light beam representing the video image and emitted from the optical modulation element.

The lighting device and projection type video display apparatus according to the present disclosure can couple the light beam from the plurality of light sources and effectively provide the high-brightness projection light beam.

BRIEF DESCRIPTION OF DRAWINGS

FIGS. 3A and 3B are views illustrating an arrangement state of first and second triangular prisms of a luminous flux combination unit in the projection type video display apparatus;

FIG. 6 is a view illustrating a problem of the luminous flux combination unit;

FIGS. 7A and 7B are views illustrating an appearance of the first and second triangular prisms of the luminous flux combination unit;

DETAILED DESCRIPTION OF PREFERRED EMBODIMENT

Hereinafter, a preferred embodiment of the present disclosure will be described with reference to the drawings. However, the detailed description beyond necessity is occasionally not given. For example, the detailed description of a well-known matter or the overlapping description of a substantially identical configuration is occasionally not given. This is because the redundant description beyond necessity is avoided to facilitate easy understanding of those skilled in the art. It is noted that the inventor provides the accompanying drawings and the following description in order to not limit claims but encourage those skilled in the art to sufficiently understand the present disclosure.

In the following embodiments, a projector is described as an example of the video display apparatus. However, the video display apparatus is not limited to the projector, but the video display apparatus may be a television receiver or another kind of display device as long as the video display apparatus includes a plurality of light sources.

First Embodiment

1. Configuration and Operation of Projection Type Video Display Apparatus

Figure 1:
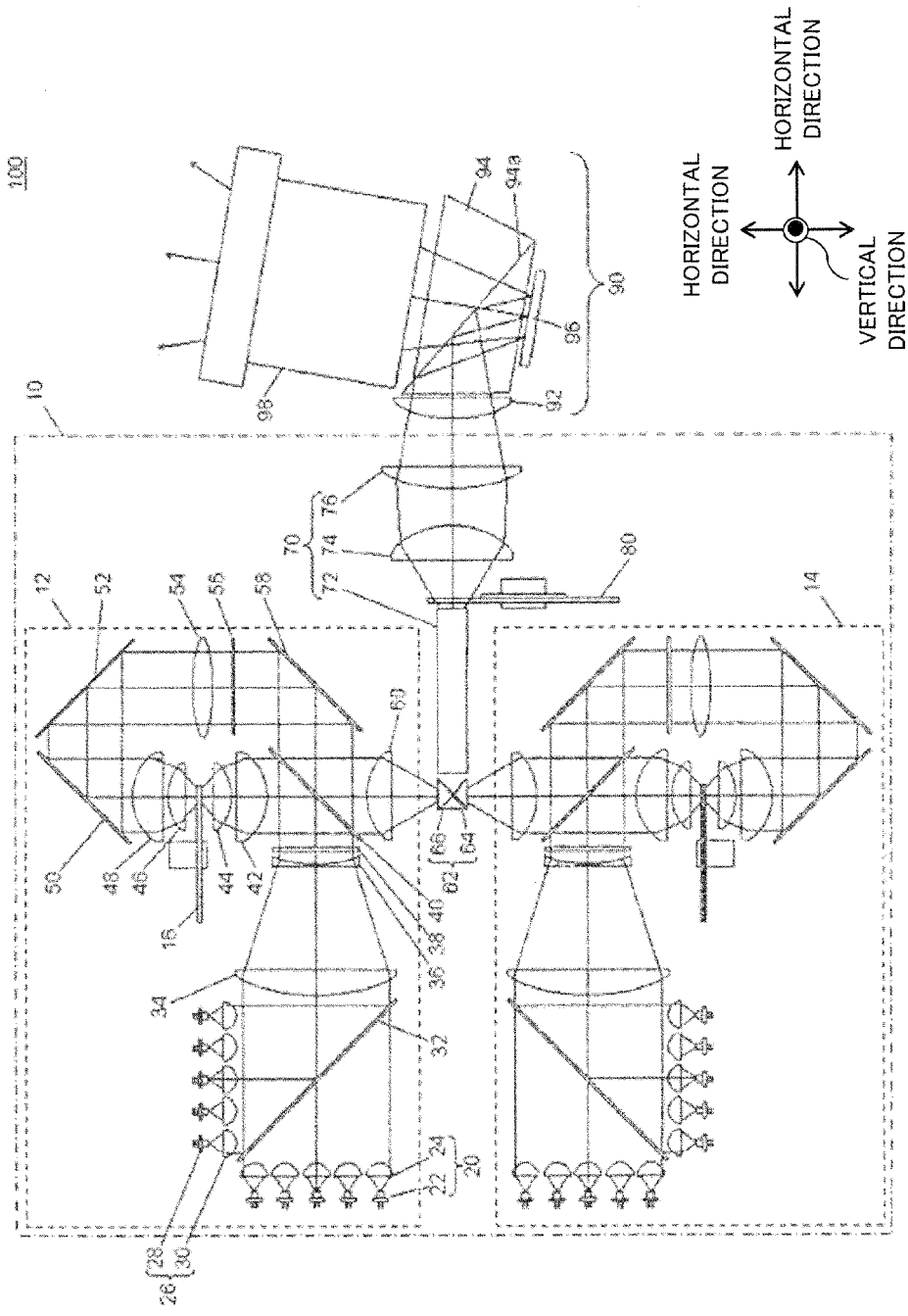
FIG. 1 is a view illustrating a configuration of a projection type video display apparatus according to an embodiment.

FIG. 1 is a view illustrating a configuration of a projection type video display apparatus according to an embodiment. FIG. 1 illustrates the configuration when a projection type video display apparatus 100 is viewed from above. In the projection type video display apparatus 100 of the embodiment, a direction parallel to a direction in which a light beam from a light source travels is referred to as a "horizontal direction", and a direction perpendicular to a direction in which a light beam from a light source travels is referred to as a "vertical direction".

Referring to FIG. 1, the projection type video display apparatus 100 includes a lighting device 10, a video generator 90, and a projection lens 98. The projection lens 98 projects a video light beam generated by the video generator 90 to a screen (not illustrated).

The lighting device 10 includes a first light source device 12, a second light source device 14, an optical coupling device 62 that spatially couples an outgoing light beam from each light source device, and a light guide optical system 70 that guides a coupled luminous flux to the video generator 90.

The first light source device 12 and the second light source device 14 include the same components, and the same components are symmetrically arranged between the devices 12 and 14. Accordingly, for the sake of convenience, only a configuration of the first light source device 12 will be described below.

The first light source device 12 includes a first laser module 20 and a second laser module 26. The laser modules 20 and 26 include semiconductor lasers 22 and 28 arranged in a 5-by-5 matrix shape to output a blue laser beam having a wavelength of 450 nm and lenses 24 and 30 provided on an output side of the semiconductor lasers, respectively. Each of the lenses 24 and 30 has a function of collecting the light beam emitted from the semiconductor laser with a spread angle into the parallel light beam.

The outgoing light beams from the laser modules 20 and 26 are spatially coupled by a mirror 32. The semiconductor lasers 22 and 28 of the first and second laser modules 20 and 26 are arranged at equal intervals. Positions of the laser modules 20 and 26 are adjusted such that the outgoing light beam from the first laser module 20 and the outgoing light beam from the second laser module 26 are incident on different positions on the mirror 32.

In the mirror 32, AR coating having high transmittance to a laser beam is applied to a region on which the outgoing light beam from the first laser module 20 is incident. In the mirror 32, mirror coating having high reflection to the laser beam is applied to a region on which the outgoing light beam from the second laser module 26 is incident.

The laser beams coupled by the mirror 32 is collected by a lens 34. The light beam collected by the lens 34 is transmitted through a lens 36 and a diffuser plate 38, and is incident on a dichroic mirror 40. The lens 36 has a function of returning the light beam collected by the lens 34 to the parallel light beam. The diffuser plate 38 has a function of decreasing coherence of the laser beams and adjusting light-collection ability of the laser beam.

The dichroic mirror 40 is a color combining element having a cutoff wavelength set to about 480 nm. The light beam substantially parallelized by the lens 36 is reflected by the dichroic mirror 40, and is irradiated to a phosphor wheel 16.

The laser beam incident to the phosphor wheel 16 is collected by lenses 42 and 44 in order to reduce a spot size of the laser beam to improve light use efficiency.

Figure 2A:
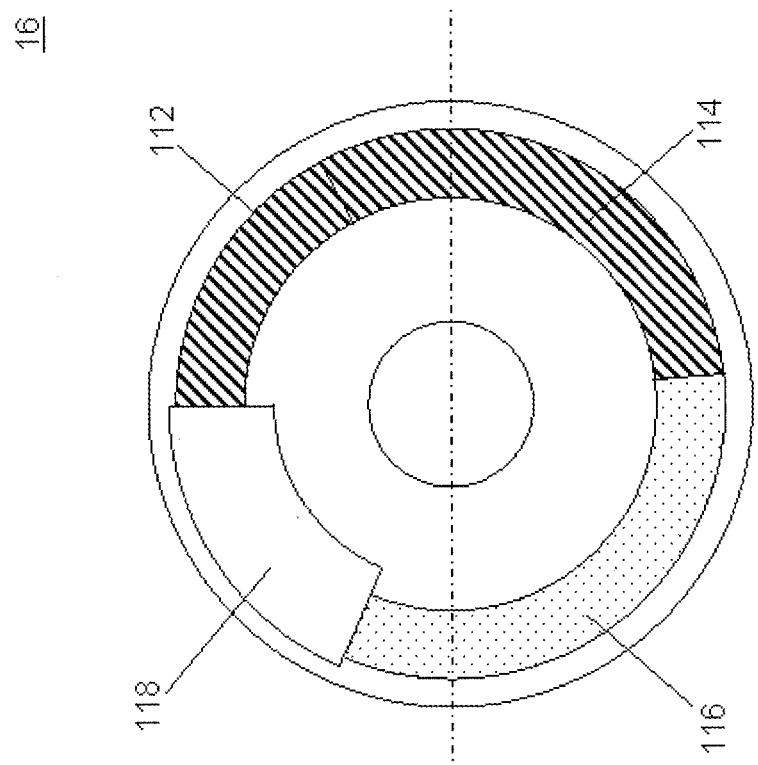
FIGS. 2A and 2B are views illustrating a phosphor wheel in the projection type video display apparatus.
Figure 2B:
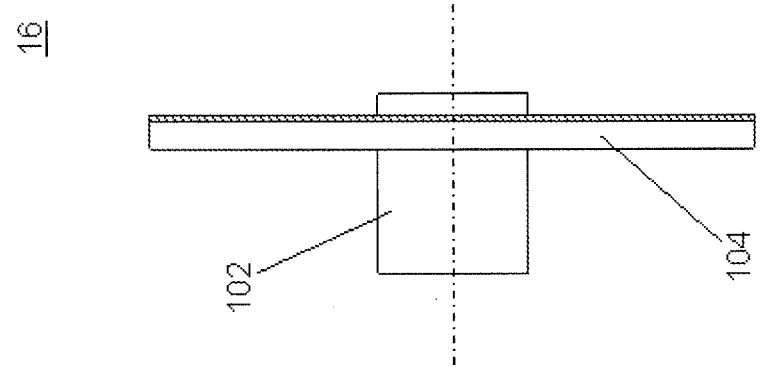

FIGS. 2A and 2B are views illustrating a configuration of the phosphor wheel 16. FIG. 2A is a plan view of the phosphor wheel 16, and FIG. 2B is a side view of the phosphor wheel 16.

The phosphor wheel 16 includes phosphor regions 112 and 114, a phosphor region 116, and a cutting region 118. A phosphor that emits a yellow light beam having a main wavelength of 570 nm by the light beam having the wavelength of 450 nm is applied to the phosphor regions 112 and 114. A phosphor that emits a green light beam having a main wavelength of 552 nm by the light beam having the wavelength of 450 nm is applied to the phosphor region 116. The cutting region 118 is a region where a part of the wheel is notched.

The identical yellow phosphor having a width of 4 mm and a thickness of 150 μm is applied to the phosphor regions 112 and 114, mixed with silicone resin.

Each of the phosphors is applied to an aluminum substrate 104 having a diameter of 65 mm. High-reflection coating is applied to a surface of the aluminum substrate 104. The aluminum substrate 104 is attached to a motor 102 and rotation of the aluminum substrate 104 is controlled.

The phosphor wheel 16 is formed such that three phosphor regions 112, 114, and 116 and one cutting region 118 constitute one frame (for example, 1/180 second). The one frame is divided temporally to four segments. That is, the phosphor region 112 is irradiated with the light beam incident on the phosphor wheel 16 in a first segment, the phosphor region 114 is irradiated in a second segment, the phosphor region 116 is irradiated in a third segment, and the cutting region 118 is irradiated in a fourth segment.

Returning to FIG. 1, during the first, second, and third segments, the light beam incident on the phosphor wheel 16 is converted into the yellow or green light beam, and reflected from the phosphor wheel 16. These fluorescent light beams are parallelized by the lenses 44 and 42, returning to and then transmitting through the dichroic mirror 40.

On the other hand, during the fourth segment, the light beam incident on the phosphor wheel 16 transmits through the phosphor wheel 16. Mirrors 50, 52, and 58 are arranged on an optical path in order to return the light beam transmitting through the phosphor wheel 16 to the dichroic mirror 40. The light beam transmitting through the phosphor wheel 16 is collected by the lenses 42 and 44. For this reason, lenses 46 and 48 are arranged in order to parallelize the light beam collected by the lenses 42 and 44. A lens 54 that relays the extended optical path and a diffuser plate 56 that further decreases the coherence of the laser beam are provided.

The light beam transmitting through the phosphor wheel 16, passing the relayed optical path and returning to the dichroic mirror 40 is reflected by the dichroic mirror 40. Thus, the optical path of the light beam transmitting through the phosphor wheel 16 and the optical path of the light beam reflected by the phosphor wheel 16 are spatially coupled by the dichroic mirror 40.

The light coupled by the dichroic mirror 40 is collected by a lens 60 to constitute horizontally outgoing light beam from the first light source device 12. Similarly, the horizontal light beam emits from the second light source device 14. The rotation of the phosphor wheel of the second light source device 14 is controlled in synchronization with the phosphor wheel 16 of the first light source device 12. Accordingly, the outgoing light beam from the first light source device 12 and the outgoing light beam from the second light source device 14 become the identical color.

The horizontally outgoing light beams from the first and second light source devices 12 and 14 are spatially coupled by the optical coupling device 62.

Figure 4B:
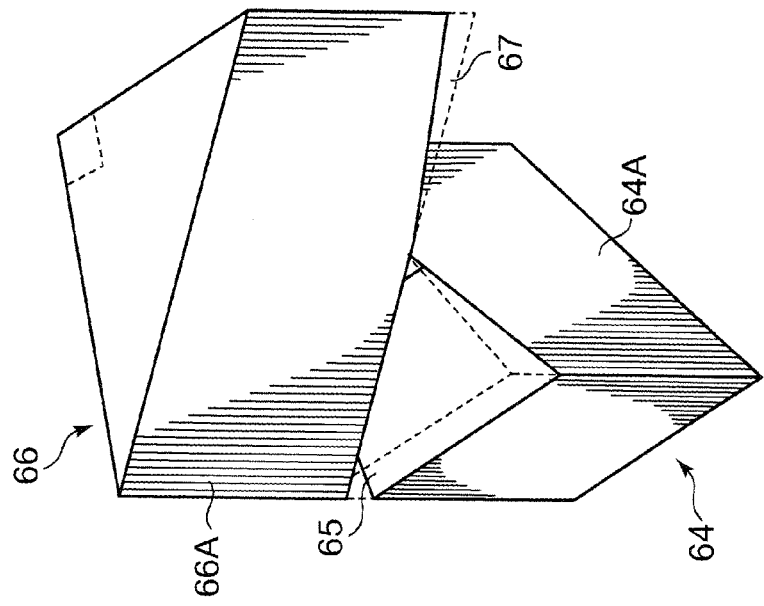
FIGS. 4A and 4B are views illustrating the arrangement state of first and second triangular prisms of the luminous flux combination unit.
Figure 4A:
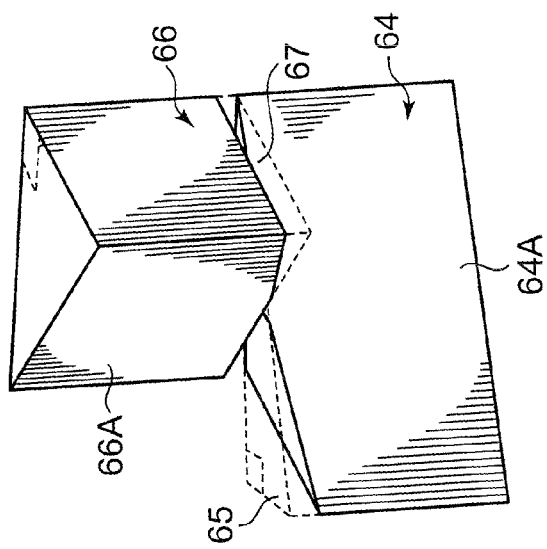

As illustrated in FIGS. 3 and 4, the optical coupling device 62 includes a first triangular prism 64 and a second triangular prism 66 that is arranged on a top side in the vertical direction of the first triangular prism 64. The first and second triangular prisms 64 and 66 have a shape of triangle pole which has an isosceles right triangle shape in cross-section, and a portion 65 or 67 of each of top surface and bottom surface of the triangle pole is a cutout portion (cutout region). The first triangular prism 64 includes a first side surface 64A that includes a hypotenuse of the isosceles right triangle and second and third side surfaces 64B and 64C that intersect with each other at a right angle. The second triangular prism 66 includes a first side surface 66A that includes the hypotenuse of the isosceles right triangle and second and third side surfaces 66B and 66C that intersect with each other at a right angle. The first triangular prism 64 reflects the outgoing light beam from the first light source device 12 on the first side surface 64A. The second triangular prism 66 reflects the outgoing light beam from the second light source device 14 on the first side surface 66A.

Figure 5:
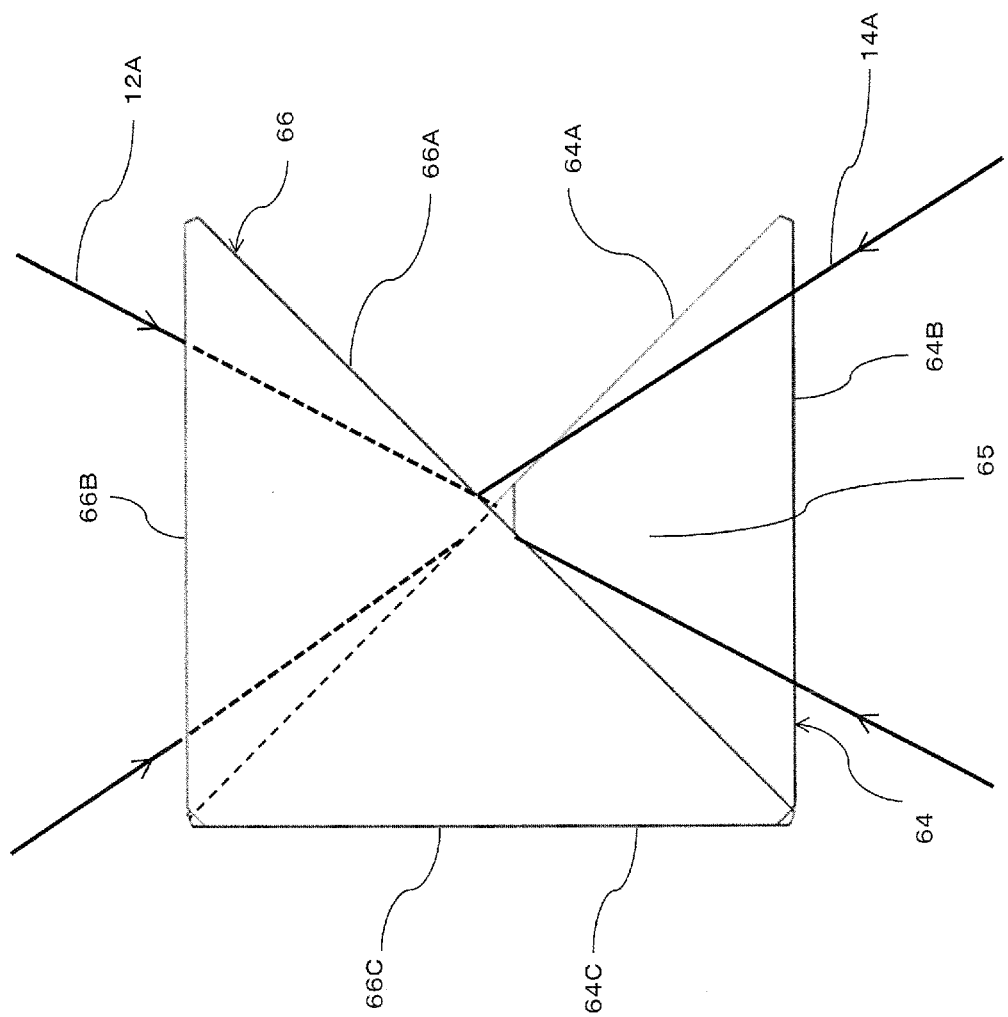
FIG. 5 is a plan view of the luminous flux combination unit.

FIG. 5 is a plan view of the optical coupling device. As illustrated in FIG. 5, the first and second triangular prisms 64 and 66 reflects outgoing light beams 12A and 14A from the first and second light source devices 12 and 14 on the first and second side surfaces 64A and 66A of the first and second triangular prisms 64 and 66, respectively, guiding the reflected light beams in the identical direction. For this purpose, the first and second side surfaces 64A and 66A of the first and second triangular prisms 64 and 66 are arranged so as to intersect with each other when viewed from above in the vertical direction.

It is necessary that the coupled light beams reflected by the first and second side surfaces 64A and 66A of the first and second triangular prisms 64 and 66 be efficiently incident on a rod integrator 72 described below.

In order to cause the coupled light beams reflected by the first and second triangular prisms 64 and 66 to be efficiently incident on the rod integrator 72, it may be effective that a first reflection spot 68, on the first side surface 64A of the triangular prism 64, at which the outgoing light beam 12A from the first light source device 12 is reflected and a second reflection spot 69, on the first side surface 66A of the second triangular prism 66, at which the outgoing light beam 14A from the second light source device 14 is reflected be vertically brought close to each other.

A problem caused by vertically bringing the first and second reflection spots 68 and 69 close to each other will be described below with reference to FIG. 6. FIG. 6 illustrates the optical coupling device composed of triangular prisms 64Z and 66Z to which the cutout portions 65 and 67 are not provided. A positional relationship between the triangular prisms 64Z and 66Z is identical to the positional relationship between the first and second triangular prisms 64 and 66, and the second triangular prism 66Z is arranged above the first triangular prism 64Z.

As illustrated in FIG. 6, when the first and second reflection spots 68 and 69 are brought close to each other, the second outgoing light beam 14A from the second light source device 14 is blocked by a part (shielding portion) 64X of an upper portion of the first triangular prism 64Z before the second outgoing light beam 14A reaches the second reflection spot 69, and light collection efficiency at the second reflection spot 69 is degraded.

The first outgoing light beam 12A from the first light source device 12 is blocked by a part (shielding portion) 66X of a lower portion of the second triangular prism 66Z before the first outgoing light beam 12A reaches the first reflection spot 68, and light collection efficiency at the first reflection spot 68 is degraded.

Figure 8:
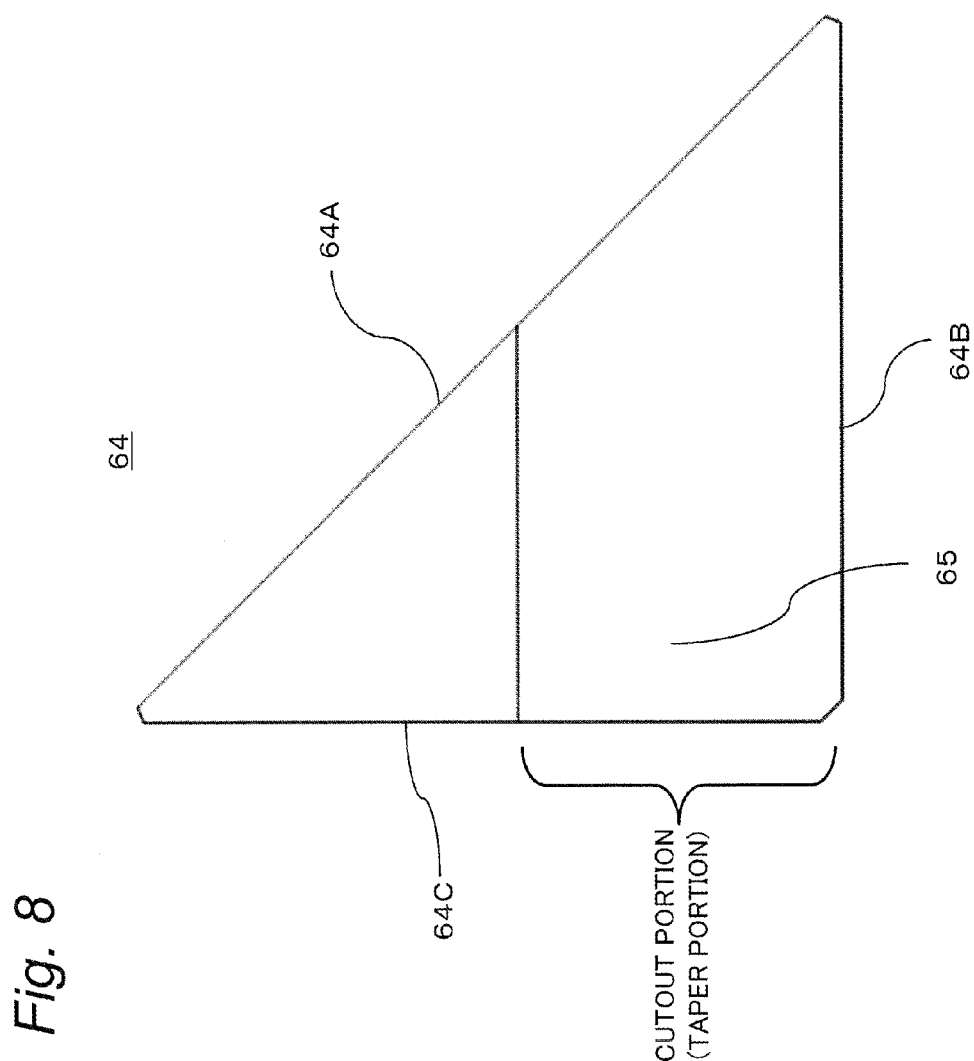
FIG. 8 is a plan view illustrating the first triangular prism included in the luminous flux combination unit.

In the embodiment, as illustrated in FIGS. 7A and 8, the first cutout portion 65 is partially provided in a part of the top portion of the first triangular prism 64 by removing the shielding portion 64X. That is, the first triangular prism 64 has the shape in which a part of the top portion of the first triangular prism 64 is cutout portion from the original triangle pole in a tapered manner (quantity of a cutout portion increases toward the second side surface 64B) toward the second side surface 64B from a central portion of the top surface of the first triangular prism 64.

Similarly, as illustrated in FIG. 7B, for the second triangular prism 66, the second cutout portion 67 is provided in a part of the bottom portion of the second triangular prism 66 by removing the shielding portion 66X. That is, the second triangular prism 66 has the shape in which a part of the bottom surface of the second triangular prism 66 is cutout portion from the original triangle pole in a tapered manner (quantity of a cutout portion increases toward the second side surface 66B) toward the second side surface 66B from a central portion of the bottom surface of the second triangular prism 66.

The first and second cutout portions 65 and 67 are tapered such that a depth of the cutout portion increases toward an end portion from the center of the top surface of each of the triangular prisms 64 and 66. Sine the outgoing light beams 12A and 14A from the light source devices 12 and 14 are collected by the lens 60, the outgoing light beams 12A and 14A travel while spot diameters of the outgoing light beams 12A and 14A decrease (see FIGS. 9 and 10). Therefore, the cutout portions 65 and 67 are made tapered in consideration of the change in spot diameter, so that the outgoing light beams 12A and 14A can be transmitted while not blocked by the part (shielding portion) of the triangular prism.

The first and second triangular prisms 64 and 66 have the same shape, and the first and second cutout portions 65 and 67 have the same shape.

The first triangular prism 64 is arranged such that the first side surface 64A faces the outgoing light beam 12A from the first light source device 12 (see FIGS. 9 and 10) and such that the first cutout portion 65 is positioned on the top side (see FIGS. 3 and 4).

The second triangular prism 66 is arranged such that the first side surface 66A faces the outgoing light beam 14A from the second light source device 14 (see FIGS. 9 and 10) and such that the second cutout portion 67 is positioned on the bottom side (see FIGS. 3 and 4).

The second triangular prism 66 is placed and fixed on the first triangular prism 64 such that the surface of the third side surface 64C adjacent to the first side surface 64A of the first triangular prism 64 is aligned with the surface of the third side surface 66C adjacent to the first side surface 66A of the second triangular prism 66 when viewed from above in the vertical direction (the direction toward the first triangular prism 64 from the second triangular prism 66), thereby forming the optical coupling device 62.

Figure 11:
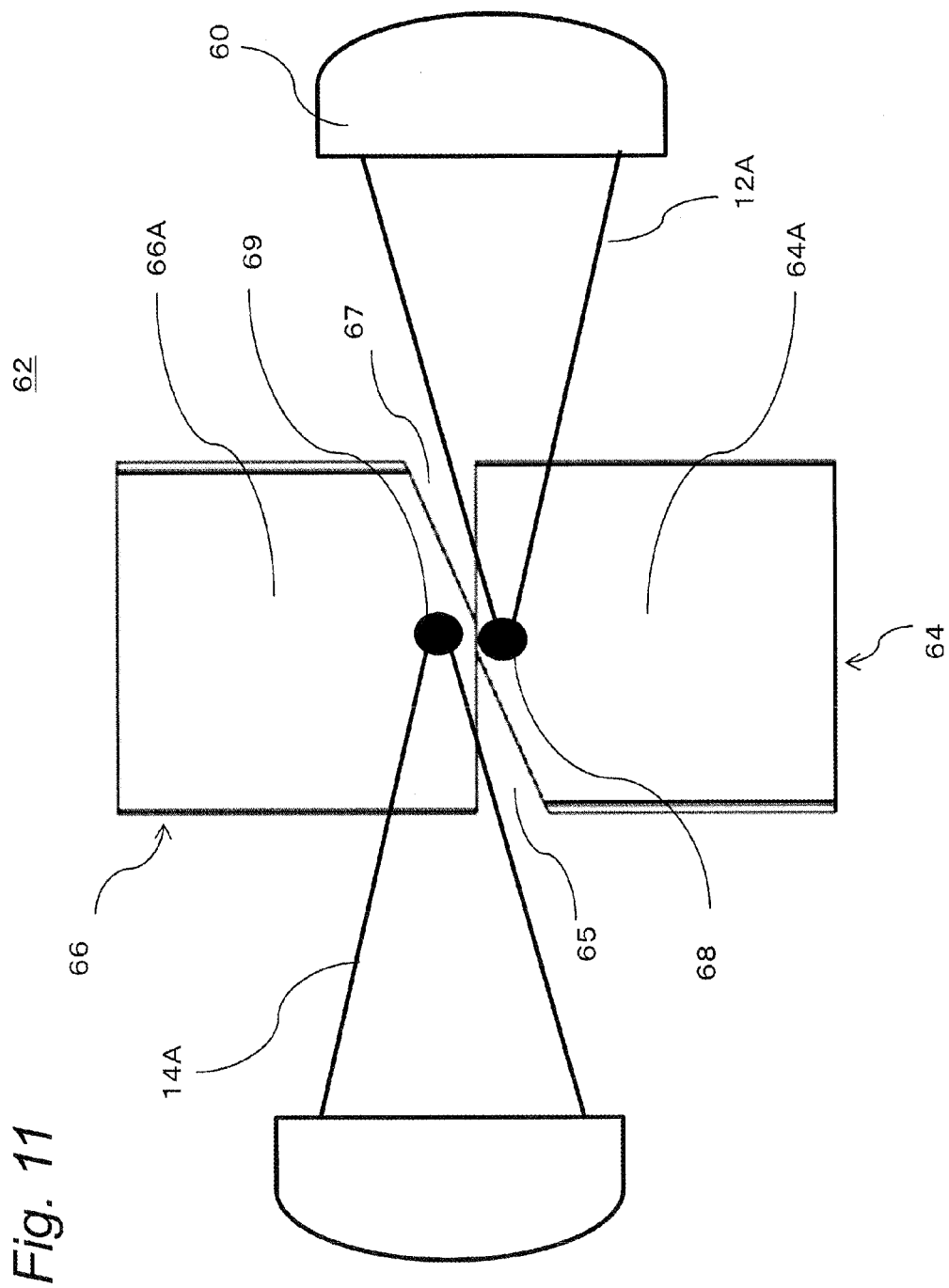
FIG. 11 is a view illustrating a state in which the light beams from the light source devices are incident on the first and second triangular prisms of the luminous flux combination unit.

As illustrated in FIG. 11, the first reflection spot 68, on the first side surface 64A of the first triangular prism 64, at which the first outgoing light beam 12A obtained by collecting the outgoing light beam from the first light source device 12 is reflected and the second reflection spot 69, on the first side surface 66A of the second triangular prism 66, at which the second outgoing light beam 14A obtained by collecting the outgoing light beam from the second light source device 14 is reflected are horizontally located at the same position and vertically brought close to each other.

Figure 9A:
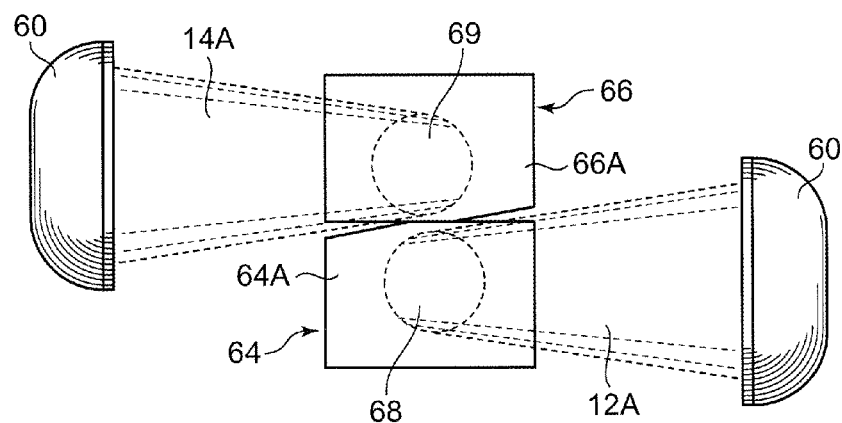
FIGS. 9A and 9B are views illustrating incident states of outgoing light beams from light source devices to the first and second triangular prisms of the luminous flux combination unit.
Figure 9B:
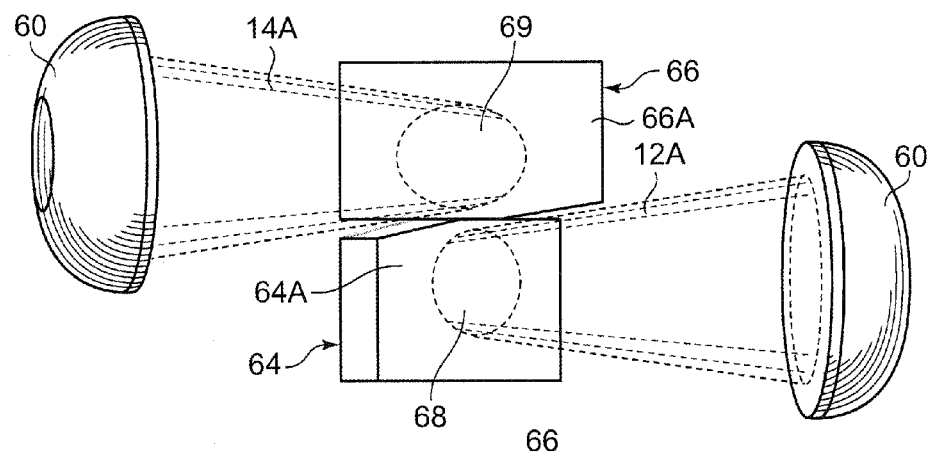
Figure 10:
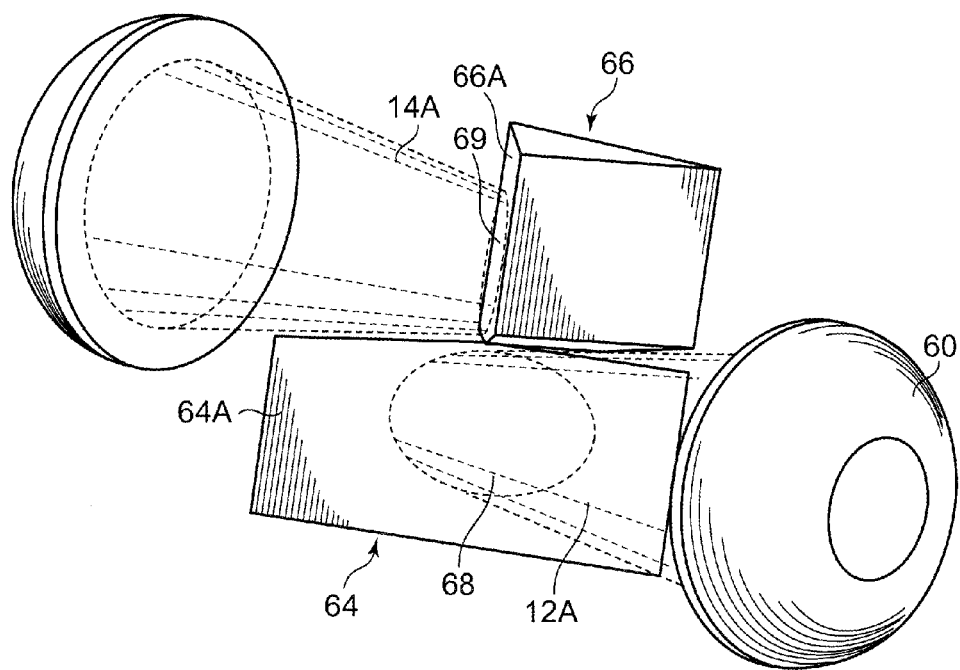
FIG. 10 is a view illustrating the incident states of outgoing light beams from light source devices to the first and second triangular prisms of the luminous flux combination unit.

As illustrated in FIGS. 9, 10, and 11, the second cutout portion 67 allows the first outgoing light beam 12A from the first light source device 12 to reach the first reflection spot 68 while not blocked by the second triangular prism 66.

The first cutout portion 65 allows the second outgoing light beam 14A from the second light source device 14 to reach the second reflection spot 69 while not blocked by the first triangular prism 64.

Figure 12:
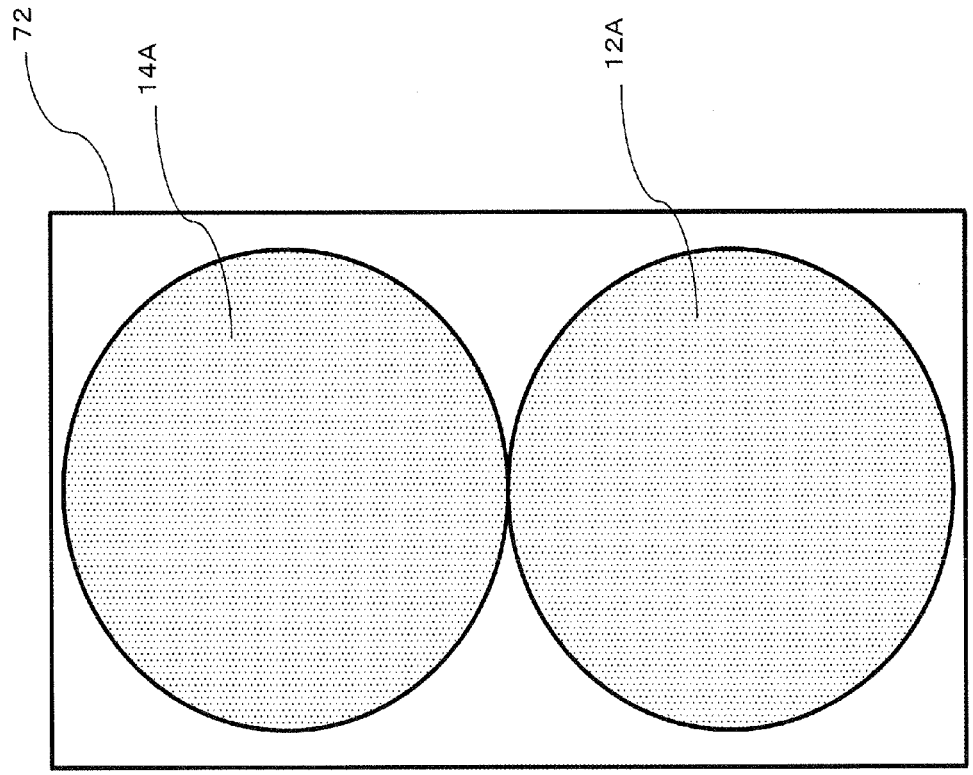
FIG. 12 is a view illustrating a state in which a coupled light beam is incident on an incident surface of a rod integrator in the projection type video display apparatus.

FIG. 12 is a view illustrating the first outgoing light beam 12A, which is reflected by the first reflection spot 68 and is incident on the rod integrator 72, and the second outgoing light beam 14A, which is reflected by the second reflection spot 69 and is incident on the rod integrator 72. The rod integrator 72 having a rectangular shape in cross-section is arranged such that a lengthwise direction of the cross-section surface is oriented toward the vertical direction. As illustrated in FIG. 12, the first outgoing light beam 12A from the first light source device 12 which is reflected at the first reflection spot 68, and the second outgoing light beam 14A from the second light source device 14 which is reflected at the second reflection spot 69 enter the rod integrator 72 in parallel at the positions vertically close to each other.

As described above, the first cutout portion 65 is formed in the first triangular prism 64 and the second cutout portion 67 is formed in the second triangular prism 66. This arrangement allows the blocking of the light beams incident on the first and second triangular prisms 64 and 66 due to the parts of the first and second triangular prisms 64 and 66 to be decreased, even if the first and second reflection spots 68 and 69 are located vertically closed to each other. Accordingly, the first outgoing light beam 12A from the first light source device 12 and the second outgoing light beam 14A from the second light source device 14 can be received with no loss and effectively coupled.

The first and second reflection spots 68 and 69 are located vertically brought close to each other, so that the reflected light beam at the first reflection spot 68 and the reflected light beam at the second reflection spot 69 can efficiently enter the rod integrator 72 with no loss.

In the present embodiment, the first and second outgoing light beams 12A and 14A from the first and second light source devices 12 and 14 are collected by the lens 60 to fall on the first and second triangular prisms 64 and 66 such that the spot diameters of the first and second outgoing light beams 12A and 14A are minimized on the surfaces (reflection surfaces) of the first and second triangular prisms 64 and 66. Alternatively, the first and second outgoing light beams 12A and 14A from the first and second light source devices 12 and 14 may be collected by the lens 60 such that the spot diameters of the first and second outgoing light beams 12A and 14A are minimized on the incident surface of the rod integrator 72. Alternatively, the first and second outgoing light beams 12A and 14A may be collected by the lens 60 such that the spot diameter of the first or second outgoing light beam 12A or 14A is minimized at a position between the surface (reflection surface) of the first or second triangular prism 64 or 66 and the incident surface of the rod integrator 72.

The light beams exiting from the light source devices and entering the rod integrator 72 pass through a filter wheel 80, after illuminance thereof is homogenized in the rod integrator 72.

Figure 13B:
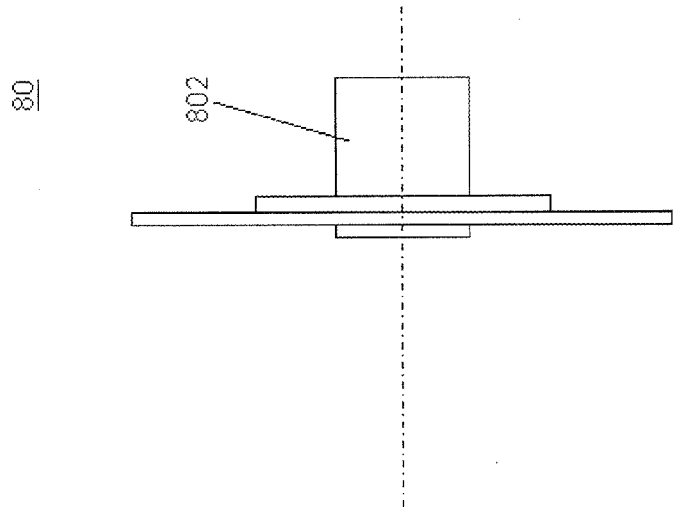
FIGS. 13A and 13B are views illustrating a filter wheel of the projection type video display apparatus.
Figure 13A:
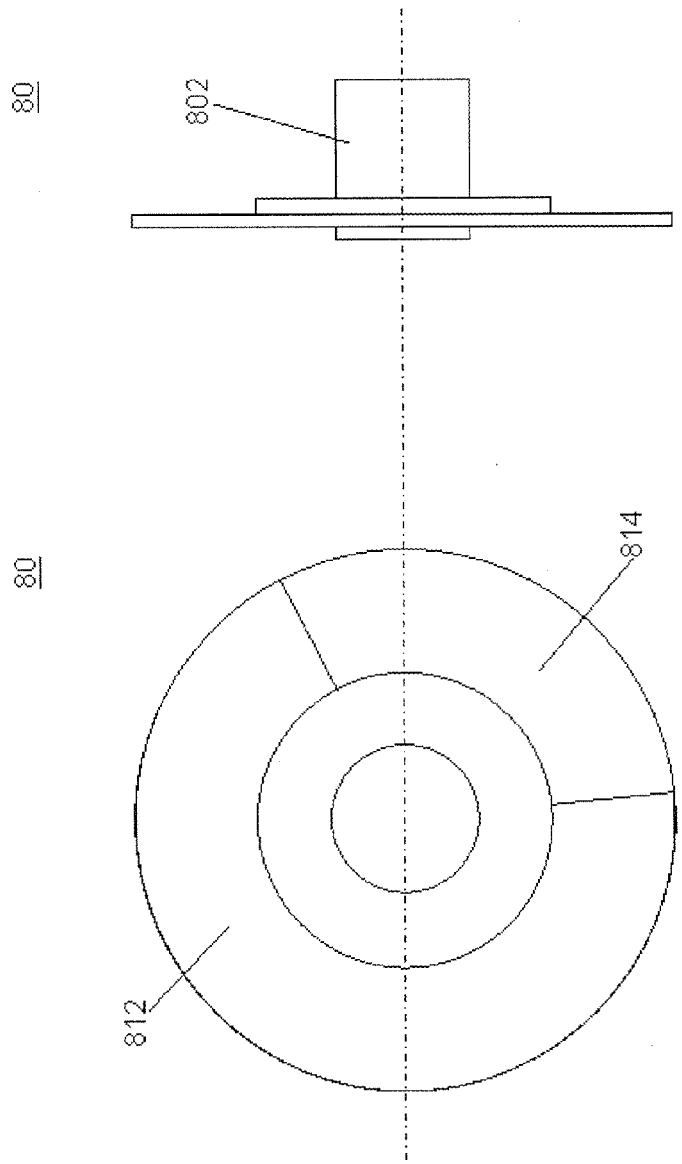

FIGS. 13A and 13B are configuration diagrams of the filter wheel 80. FIG. 13A is a plan view of the filter wheel 80, and FIG. 13B is a side view of the filter wheel 80.

The filter wheel 80 includes a glass substrate 812 and a color filter 814. The glass substrate 812 is a region made of a glass substrate having the high transmittance in a whole visible light range. The color filter 814 is a region made of a color filter substrate having the high reflectance at a wavelength less than 600 nm and the high transmittance of the visible light range at a wavelength of 600 nm or more. The glass substrate 812 and the color filter 814 are attached to a motor 802 and the rotations of the glass substrate 812 and the color filter 814 are controlled.

The rotation of the filter wheel 80 is controlled in synchronization with the phosphor wheel 16. The filter wheel 80 is made such that glass substrate 812 and the color filter 814 constitute one frame (for example, 1/180 second).

The rotations of the phosphor wheel 16 and filter wheel 80 are adjusted such that the yellow fluorescence light, which is emitted from the phosphor region 114 by irradiating the phosphor region 114 of the phosphor wheel 16 with the laser beam, falls on the color filter 814 of the filter wheel 80.

For this purpose, angles of segments of the phosphor region 114 and color filter 814 are identical to each other. Since the color filters 814 removes the light beam having the wavelength less than 600 nm, a shorter-wavelength component is removed in the yellow fluorescence light emitted from the phosphor region 114, so that the red light beam is generated and exits from the filter wheel 80.

The light beam exiting from the filter wheel 80 is output from the lighting device 10 through the lenses 74 and 76 to the video generator 90. As described above, the lighting device 10 includes optical components such as various lenses and mirrors.

The video generator 90 includes a lens 92, a total reflection prism 94, and one DMD (Digital Mirror Device) 96. The lens 92 forms, on the DMD 96, an image of the light beam from the outgoing surface of the rod integrator 72. The light beam incident on the total reflection prism 94 through the lens 92 is reflected at a surface 94a of the total reflection prism 94, and guided to the DMD 96. Because of the incident angle on the DMD 96, the rod integrator 72 is arranged such that the lengthwise direction in section of the rod integrator 72 is oriented toward the vertical direction.

The DMD 96 is controlled by a controller (not illustrated) at timing of each incident color light beam according to the input video signal. The light beam modulated by the DMD 96 is transmitted through the total reflection prism 94, and guided to the projection lens 98. The projection lens 98 projects the temporally-coupled video light beam to the screen (not illustrated).

In the present embodiment, the DMD 96 as an optical modulation element has a diagonal size of 0.67 inch, and an F number of the projection lens 98 is set to 1.7. Instead of the DMD, a liquid crystal display device may be used as the optical modulation element.

As described above, in the present embodiment, the lighting device 10 outputs the light beams of four colors, namely, the red color light beam, the green light beam, the blue light beam, and the yellow light beam, switching them temporally.

At this case, the red light beam is generated not by the red phosphor but by removing the shorter-wavelength component from the yellow fluorescence light of the yellow phosphor. That is, the red light beam and the yellow light beam are generated by the same yellow phosphor.

In order to obtain the high-brightness lighting device, it is necessary to increase the laser beam intensity exciting the phosphor. However, when the laser beam intensity is increased, a problem occurs in that unfortunately phosphor efficiency is degraded and phosphor temperature is increased. In the present embodiment, the two phosphor substrates are provided to constrain heat generation per phosphor substrate. Hence, the influence of this problem is minimized to obtain the high-brightness and high-efficiency light beam.

2. Effect, etc.

The lighting device 10 of the present embodiment includes two (plural) light sources 12 and 14, an optical coupling device 62 including two triangle prisms (reflection members) 64 and 66 each having a reflection surface 64A, 66A, wherein the optical coupling device reflects a plurality of light beams emitted in a plurality of directions from the plurality of light sources 12 and 14 at the reflection surfaces 64A, 66A of the two triangle prisms 64, 66 and couples the plurality of light beams to generate a coupled light beam in an identical direction, and the rod integrator 72 that homogenizes the coupled light beam from the optical coupling device 62. In at least one of the two triangle prisms 64 and 66, a cutout portion (cutout region) 65 and/or a 67 is formed to transmit an incident light beam on the reflection surface of the other reflection member such that the incident light beam is not blocked by a part of a region of the at least one reflection member on the way to the reflection surface of the other triangle prism.

With this configuration, even if the first and second reflection spots are vertically brought close to each other, the first outgoing light beam from the first light source device and the second outgoing light beam from the second light source device can effectively be coupled with no loss, so that the high-brightness light beam can be output.

The first and second reflection spots 68 and 69 are located vertically close to each other, and thus the coupled light beam of the reflected light beam at the first reflection spot 68 and the reflected light beam at the second reflection spot 69 can effectively enter the rod integrator 72 with no loss.

Since the first and second triangular prisms 64 and 66 are formed in the same shape, the number of components can be decreased and the configuration of the optical coupling device can be simplified.

In the embodiment, the one lighting device includes two light source devices, and in each light source device, the phosphor substrate to which the cerium-activated garnet structure phosphor having the high emission efficiency and the excellent temperature quenching characteristic is applied is used. Additionally, the intensity and spot diameter of the laser beam incident on the phosphor substrate are optimized to implement the high efficiency.

The use of the above optical configuration can improve the optical output while the phosphor temperature rise is constrained, so that the high-brightness and long-life lighting device can be achieved.

Other Embodiments

In the above embodiment, the optical coupling device of the present disclosure is used to couple the fluorescent light beams converted by the phosphor wheel. However, the optical coupling device of the present disclosure is not limited to the coupling of the fluorescent light beams. For example, the optical coupling device of the present disclosure can be applied to coupling of outgoing light beams from a plurality of light source lamps.

In the above embodiment, the optical coupling device is composed of stacked two prisms. Instead, the optical coupling device may be composed of a single prism.

In the above embodiment, the optical coupling device 62 is made of the triangular prism. Instead, for example, the optical coupling device 62 may be made of a prism having the other shape such as a square pole.

The first and second triangular prisms 64 and 66 are examples of the reflection member. The optical coupling device 62 composed of the first and second triangular prisms 64 and 66 is an example of the optical coupling device. The rod integrator 72 is an example of the homogenization device. The first side surfaces 64A and 66A are examples of the reflection surface. The DMD 96 is an example of the optical modulation element.

As described above, the embodiment that is considered to be the best mode by the inventor and modifications are provided with reference to the accompanying drawings and detailed description. These are provided to those skilled in the art in order to illustrate claims of the present disclosure.

Accordingly, various changes, substitutions, additions, and omissions can be made in claims of the present disclosure or the equivalent range.

INDUSTRIAL APPLICABILITY

The present disclosure can be applied to the lighting device that couples and uses the light beam from the plurality of light sources and the projection type video display apparatus provided with the lighting device. Specifically, the present disclosure can be applied to a television receiver and the like in addition to the projector.

What is claimed is:

1. A lighting device comprising:
a plurality of light sources;
an optical coupling device comprising a plurality of reflection members each having a reflection surface, the optical coupling device reflecting a plurality of light beams emitted in a plurality of directions from the plurality of light sources at the reflection surfaces of the plurality of reflection members and coupling the plurality of light beams to generate a coupled light beam in an identical direction; and
a homogenization device that homogenizes the coupled light beam from the optical coupling device,
wherein in at least one of the plurality of reflection members, a cutout portion is formed to transmit an incident light beam on the reflection surface of the other reflection member such that the incident light beam is not blocked by a part of a region of the at least one reflection member on the way to the reflection surface of the other reflection member.

2. The lighting device according to claim 1, wherein the optical coupling device includes a first prism that includes a reflection surface and a second prism that includes a reflection surface and is located vertically on or above the first prism, in the first prism, a cutout portion is formed in a part of a region of a surface facing the second prism in order to transmit an incident light beam on the reflection surface of the second prism, and in the second prism, a cutout portion is formed in a part of a region in a surface facing the first prism in order to transmit an incident light beam on the reflection surface of the first prism.

3. The lighting device according to claim 2, wherein the first prism and the second prism have the same shape.

4. The lighting device according to claim 2, wherein a position, of the reflection surface of the first prism, on which a light falls and a position, of the reflection surface of the second prism, on which a light falls are the same in horizontal direction.

5. The lighting device according to claim 2, wherein,
the cutout portion in the first prism has a shape that increases from a central portion of the surface facing the second prism toward an end of the surface, and
the cutout portion in the second prism has a shape that increases from a central portion of the surface facing the first prism toward an end of the surface.

6. The lighting device according to claim 2, wherein an incident surface of the homogenization device has a rectangular shape, and
the light beams reflected from the first prism and the second prism are incident on the homogenization device in parallel in a lengthwise direction of the rectangular shape of the homogenization device.

7. The lighting device according to claim 1, further comprising an optical system that collects the light beam from the light source such that a diameter of the light beam is minimized on the reflection surface of the reflection member or an incident surface of the homogenization device, the optical system causing the light beam to fall on the optical coupling device.

8. A projection type video display apparatus comprising:
the lighting device according to claim 1;
an optical modulation element that modulates a light beam from the lighting device to generate a video light beam representing a video image; and
a projection lens that projects the video light beam representing the video image and emitted from the optical modulation element.

* * * * *